US 8,249,114 B2

(12) United States Patent
Vasudevan et al.

(10) Patent No.: US 8,249,114 B2
(45) Date of Patent: Aug. 21, 2012

(54) METHOD AND DEVICE FOR RECEIVING AND PROVIDING PROGRAMS

(75) Inventors: Swaminatha Vasudevan, Palo Alto, CA (US); Pritesh Mukeshbhai Dave, Fremont, CA (US); Kumaraguru Dhandapani, Fremont, CA (US); Ran Oz, Modi'in (IL); Nery Strasman, Ramat Gan (IL)

(73) Assignee: ARRIS Solutions, Inc., Suwanee, GA (US)

( * ) Notice: Subject to any disclaimer, the term of this patent is extended or adjusted under 35 U.S.C. 154(b) by 2030 days.

(21) Appl. No.: 11/200,754

(22) Filed: Aug. 9, 2005

(65) Prior Publication Data
US 2006/0034341 A1 Feb. 16, 2006

Related U.S. Application Data

(60) Provisional application No. 60/600,473, filed on Aug. 10, 2004, provisional application No. 60/662,844, filed on Mar. 16, 2005.

(51) Int. Cl.
*H04J 1/00* (2006.01)
(52) U.S. Cl. ....................................... 370/486; 370/537
(58) Field of Classification Search .................. 370/537, 370/485, 486, 487
See application file for complete search history.

(56) References Cited

U.S. PATENT DOCUMENTS

| 5,586,264 | A | * | 12/1996 | Belknap et al. ............... 725/115 |
| 6,166,730 | A | * | 12/2000 | Goode et al. .................. 715/716 |
| 6,795,506 | B1 | * | 9/2004 | Zhang et al. ............. 375/240.26 |
| 2002/0054062 | A1 | * | 5/2002 | Gerba et al. .................. 345/716 |
| 2002/0122051 | A1 | * | 9/2002 | Hose et al. .................... 345/716 |
| 2003/0067554 | A1 | * | 4/2003 | Klarfeld et al. ............... 348/461 |
| 2003/0088872 | A1 | * | 5/2003 | Maissel et al. .................. 725/46 |
| 2004/0172416 | A1 | * | 9/2004 | Murakami et al. ......... 707/104.1 |
| 2004/0226044 | A1 | * | 11/2004 | Goode ............................ 725/95 |
| 2004/0250272 | A1 | * | 12/2004 | Durden et al. .................. 725/25 |
| 2005/0132398 | A1 | * | 6/2005 | Baran et al. .................... 725/28 |
| 2005/0190794 | A1 | * | 9/2005 | Krause et al. ................. 370/485 |
| 2006/0067219 | A1 | * | 3/2006 | Dougall et al. ............... 370/230 |
| 2006/0271936 | A1 | * | 11/2006 | Matsuda et al. ............. 718/102 |

* cited by examiner

*Primary Examiner* — Sai-Ming Chan
(74) *Attorney, Agent, or Firm* — Troy A. Van Aacken; Robert J. Starr

(57) ABSTRACT

A method for providing programs, the method includes: (i) providing a program multiplex to multiple users device; (ii) considering a removal of at least one program from the multiplex in response to program viewing parameters; (iii) allowing at least one user to respond to a possible removal of the program; and (iv) determining whether to remove the al least one program in response to received user removal responses. A user device that includes a transceiver unit that is connected to a controller, wherein the device is adapted to receive a program multiplex, to receive an indication that at least one program is to be removed from the multiplex, and to selectively transmit a program removal response.

42 Claims, 13 Drawing Sheets

| PROGRAM | TUNING FREQUENCY | MODULATION TYPE | PROGRAM ID | PROGRAM TYPE |
|---|---|---|---|---|
| PROGRAMR | F1 | MOD1 | PIDR | STATIC |
| PROGRAM2 | F1 | MOD1 | PID2 | SWITCHED |
| PROGRAM3 | F2 | MOD1 | PID3 | STATIC |
|  |  |  |  |  |
|  |  |  |  |  |
| PROGRAMK | F9 | MOD1 | PIDK | SWITCHED |

CONTENT INFORMATION TABLE 200

FIGURE 7

| PROGRAMR | F3 | MOD1 | PIDR | SWITCHED |
| --- | --- | --- | --- | --- |
| PROGRAM2 | | | | REMOVED |

DIFFERENTIAL CONTENT INFORMATION 220

FIGURE 8

| PROGRAM | AMOUNT OF VIEWERS | VIEWING USERS | USER VIEWING PATTERN INFORMATION |
|---|---|---|---|
| PROGRAM1 | 1 | STB 80(1) | SWITCHED CHANNEL 5 MINUTES AGO |
| PROGRAM2 | 2 | STB 80(2) | IDLE FOR 1 HOUR |
| PROGRAM2 | 2 | STB80(3) | CHANGED CHANNEL 5 MINUTES AGO |
| | | | |
| PROGRAMK | LARGE | 80(4)-80(9) | irrelevent |

PROGRAM VIEWING TABLE 230

FIGURE 9

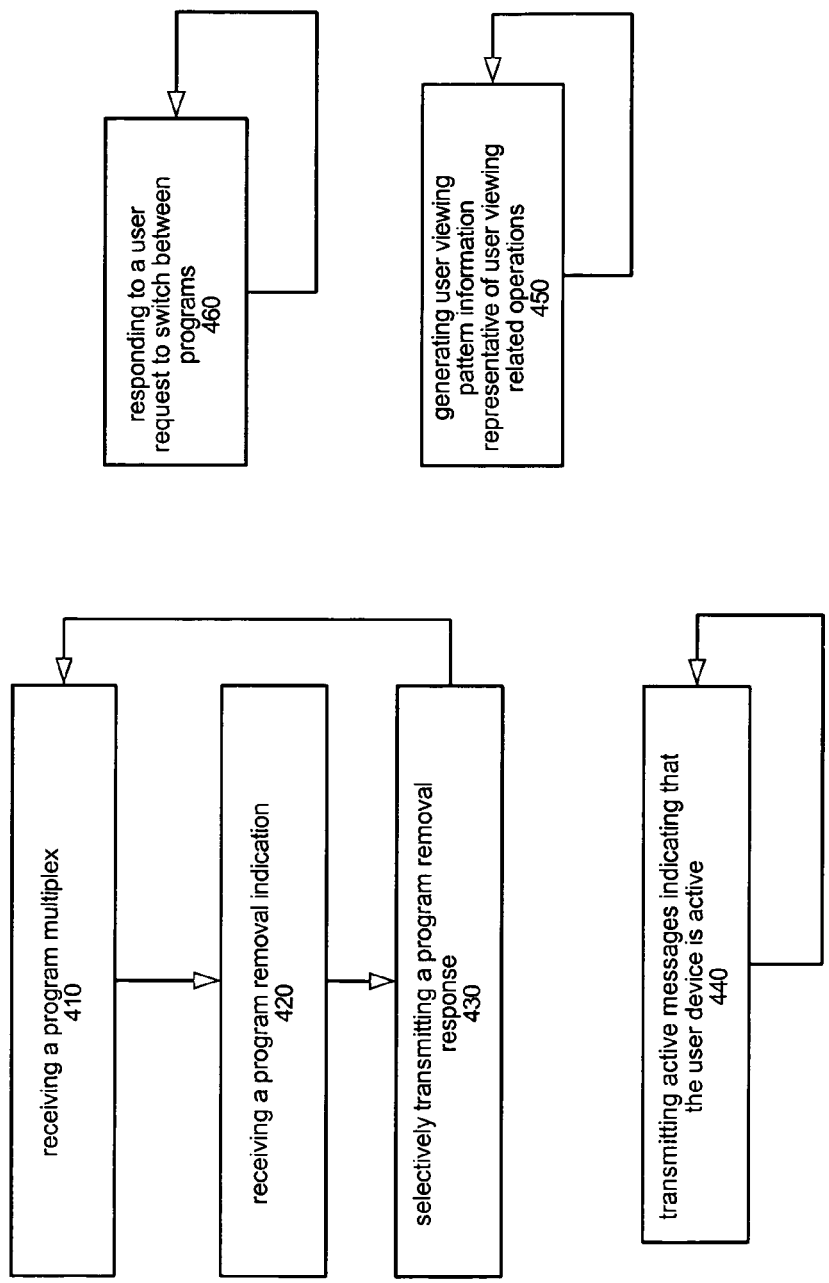

METHOD AND DEVICE FOR RECEIVING AND PROVIDING PROGRAMS

RELATED CASES

This patent claims priority from U.S. provisional patent application Ser. No. 60/600,473 filed at Aug. 10, 2004 and from U.S. provisional patent application Ser. No. 60/662,844 filed at Mar. 16, 2005 titled "switched broadcast implementation".

FIELD OF THE INVENTION

The present invention relates to communication systems and especially to methods and systems for providing programs and for receiving programs.

BACKGROUND OF THE INVENTION

The number of television channels (programs) has dramatically increased during the last decade. In addition, various technologies such as high definition television require larger amounts of bandwidth.

In order to provide many programs to multiple user devices various techniques such as statistical multiplexing and various compression schemes (such as but not limited to the MPEG compression standards) were developed. These techniques can improve the bandwidth utilization of existing infrastructure. Nevertheless, even when these techniques are implemented the number of programs that can be provided to users is relatively limited.

The following patents and patent applications, all being incorporated herein by reference, illustrate some prior art methods and devices for providing multiple programs to users: U.S. Pat. No. 6,597,670 of Tweedy et al., titled "Method and system for distributing subscriber services using wireless bidirectional broadband loops"; U.S. patent application publication serial number 2005/0033342 of Rosetti et al., titled "Technique for providing a virtual digital video recorder service through a communication network"; U.S. patent application serial number 2005/0120377 of Carlucci et al., titled "Technique for effectively providing various entertainment services thorough a communication network"; PCT patent application WO2005/008419 of Compton el al., titled "Distributed and scalable architecture for on demand session and resource management"; PCT patent application publication number WO2005/022796 of Krause et al., titled "Advanced, adaptive video multiplexing system"; PCT patent application publication number WO2005/022892 of Krause et al., titled "Video multiplexer system providing low-latency VCR-like effects and program changes" and U.S. Pat. No. 6,718,552 of Goode "network bandwidth optimization by dynamic channel allocation".

There is a need to provide efficient methods and devices for providing programs to multiple users and for receiving programs by users.

SUMMARY OF THE PRESENT INVENTION

A user device that includes a transceiver unit that is connected to a controller, wherein the device is adapted to: (i) receive a program multiplex, (ii) receive an indication that at least one program is to be removed from the multiplex; and (iii) selectively transmit a program removal response.

A device that is adapted to provide a program multiplex, the device includes: (i) a media processor adapted to generate a program multiplex; and (ii) a management unit, connected to the media processor, adapted to (a) consider a removal of at least one program from the multiplex in response to program viewing parameters, and (b) determine the removal in response to at least one received user program removal response.

A method for receiving programs that includes: (i) receiving a program multiplex; receiving a program removal indication; and (ii) selectively transmitting a program removal response.

A method for providing programs, the method includes: (i) providing a program multiplex to multiple user devices; (ii) considering a removal of at least one program from the multiplex in response to program viewing parameters; (iii) allowing at least one user to respond to a possible removal of the at least one program; and (iv) determining whether to remove the at least one program in response to received user removal responses.

BRIEF DESCRIPTION OF THE DRAWINGS

The present invention will be understood and appreciated more fully from the following detailed description taken in conjunction with the drawings in which:

FIG. 7 illustrates a content information table according to an embodiment of the invention;

FIG. 8 illustrates differential content information message according to an embodiment of the invention;

FIG. 9 illustrates a program viewing table according to an embodiment of the invention;

FIG. 13 illustrates a method for receiving programs, according to an embodiment of the invention.

DETAILED DESCRIPTION OF PREFERRED EMBODIMENTS

The disclosed technique is directed to a broadband network, which can be either wired or wireless, such as an HFC network, a DSL network, satellite communication and the like.

It is further noted that the description relates to MPEG (and especially MPEG2) compliant programs and components, but the invention is applicable to other types of media unit decoding and/or compression schemes as well. It is further noted that the media streams are also referred to as programs, although this is not necessarily so and the invention can be applied to media streams that are not programs.

According to an embodiment of the invention a device is provided. The device is adapted to provide a program multiplex. The device includes a media processor and a management unit. The media processor is adapted to generate a program multiplex. The management unit is adapted to consider a removal of at least one program from the multiplex (for example in response to program viewing parameters) and determine whether to remove the program in response to at least one user program removal response or in response to an absence of such response. This device can be included within a headend, within a hub, within a node, partially within either one of the hub, headend and node, and the like.

The program removal response can include a removal approval, an objection to the removal, a parameter that can reflect the amount of acceptance/rejection to the removal, a request to delay the removal, and the like. The requested delay period can be included within the response.

According to an embodiment of the invention a user device is provided. It includes a transceiver unit that is connected to a controller. This device is adapted to receive a program multiplex, receive an indication that at least one program is to be removed from the multiplex; and selectively transmit a program removal response.

Figure 1:
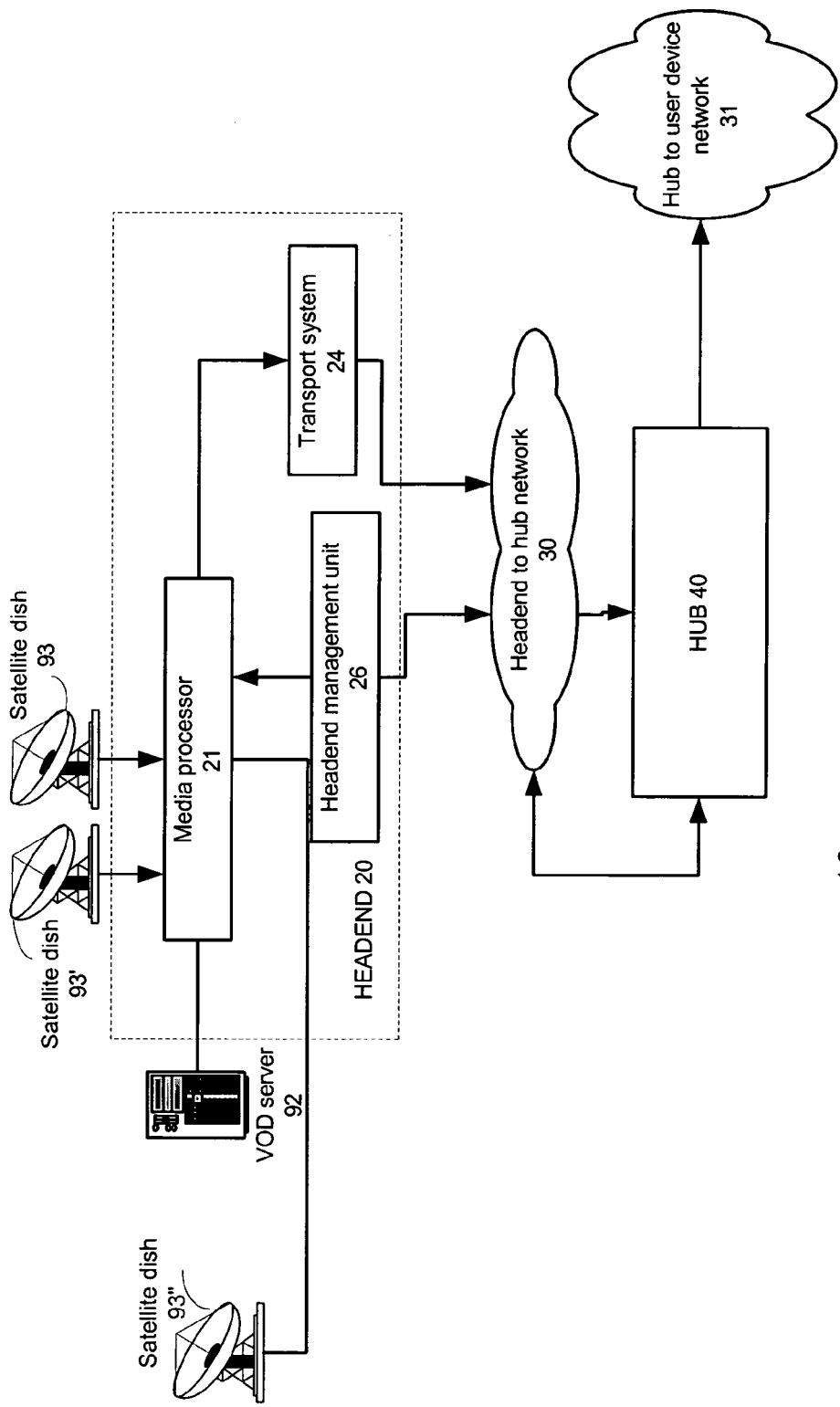
FIG. 1 illustrates a headend and a hub according to an embodiment of the invention.

FIG. 1 illustrates a headend 20 and a hub 40 according to an embodiment of the invention.

The headend 20 and hub 40 are connected to each other via a headend to hub network 30. It is noted that other configurations can be provided, including a unified hub and headend configuration.

The hub 40 is connected to multiple user devices via hub to user device network 31. This network 31 is usually a hybrid fiber coax (HFC) network, but this is not necessarily so.

Headend 20 can receive media content from various sources such as video on demand server 92, and satellite dishes 93, 93' and 93". The headend 20 includes a media processor 21 that can process programs in various manners, including rate-shaping, performing PID re-mapping, generating delayed versions of a program, duplicating programs, performing statistical multiplexing, compressing, encrypting and the like.

An exemplary broadband media router that has such media processing capabilities is described in U.S. Pat. No. 6,434,141 of Oz et al., which is incorporated herein by reference. An exemplary method and device for generating delayed version of programs is described in U.S. Pat. No. 6,813,270 of Oz et al., which is also incorporated herein by reference.

The headend transmits a headend multiplex (such as M0 of FIG. 4) to the hubs. Each hub transmits a hub multiplex (such as multiplexes M1-M3 of FIG. 4) to multiple user devices. Typically, user devices that receive the same multiplex are referred to as a user devices group.

The media processor 21 is controlled by a headend management unit 26 that may determine which media processing operations to apply and also determine which programs should be included within the headend and hub multiplexes.

Usually, headend 20 is connected to multiple hubs (for example hubs 40, 40' and 40" of FIG. 4, nodes 41 and 43 of FIG. 5), and is capable of providing to each hub a different program multiplex. It is noted that the amount of hubs can differ from three.

Alternatively, each hub can receive a headend multiplex of programs and select the programs to be included within the hub multiplex of programs. Typically, the bandwidth of the headend to hub network 30 is much larger than the bandwidth of the hub to user network 31, thus the headend multiplex can include much more programs than the hub multiplex.

The headend management unit 26 can perform additional tasks such as billing related tasks, and the like.

Headend 20 also includes a transport system 24 that is adapted to receive one or more program multiplexes from media processor 21 and to process it such as to comply to format conveyed over headend to hub network 30. This processing may include fragmentation, aggregation, packet encapsulation, and the like.

The headend management unit 26 is usually adapted to perform resource allocation. The resource allocation determines the resources (including component, frequency, bandwidth, port and the like) that are allocated for a certain task (such as a transmission of a program). The headend management unit 26 can determine which programs to include within each multiplex, when to send program removal information and how to response to received program removal responses that are transmitted by user devices.

According to another embodiment of the invention the resource management is performed, at least partially, by management units located within the hubs and/or nodes.

According to an embodiment of the invention headend 20 can determine which programs to include within each program multiplex based upon various parameters, including user viewing patterns, viewing statistics and the like.

The programs can be classified to various groups that differ from each other by the probability removal from the multiplex. As a rule of thumb programs that are viewed by a very large number of the viewers can be removed only in rare occasions, while programs that rarely viewed can be provided to users only upon request. It is noted that the programs can be classified to two types—"static" and "switched", but this is not necessarily so and more than two groups can be defined.

It is further noted that the content of a certain multiplex can be responsive to current viewing statistics, to previous viewing patterns, to expected viewing patterns, and/or to predefined criteria. Such a criteria can be responsive to a transmission priority of a program.

Figure 2:
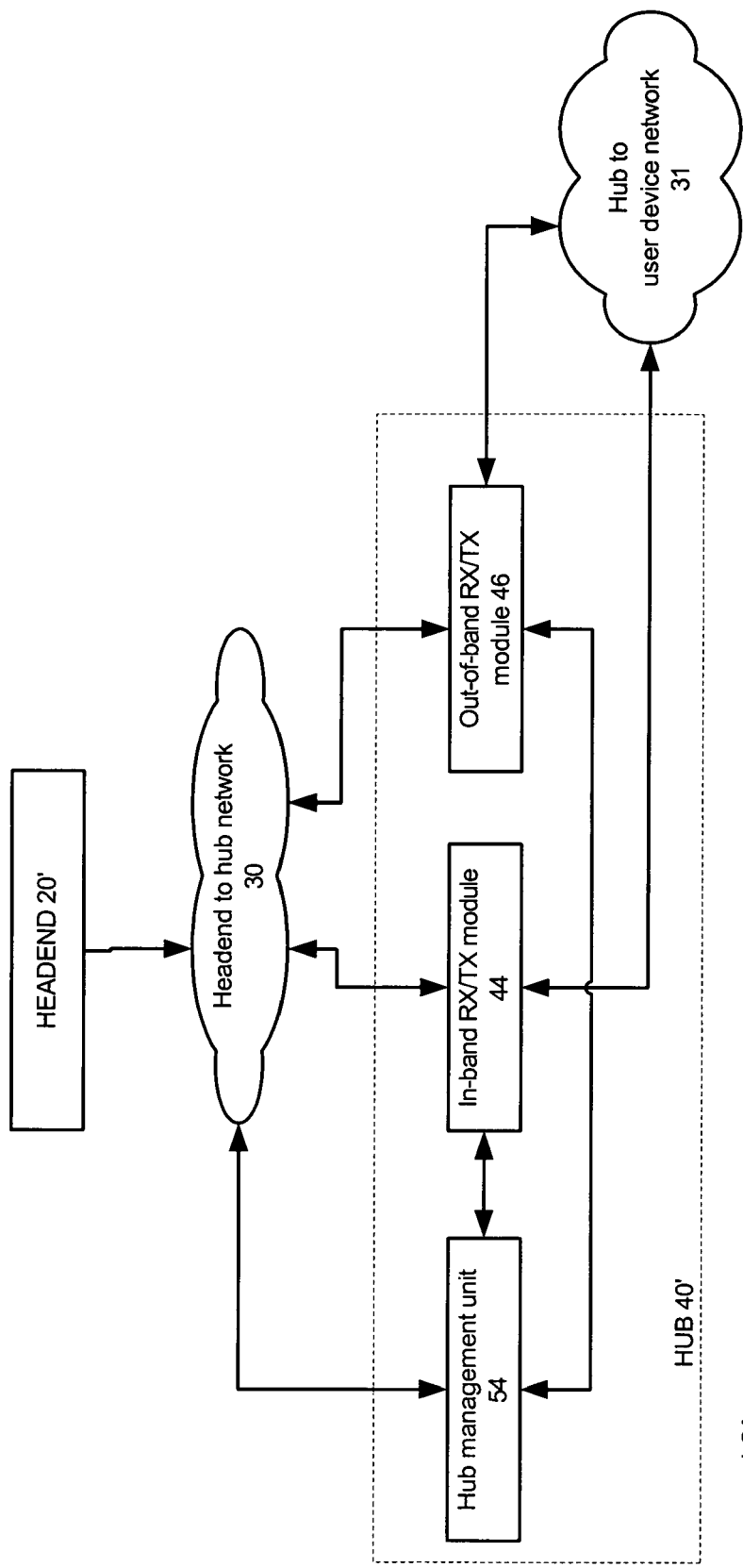
FIG. 2 illustrates a headend and a hub according to another embodiment of the invention.

FIG. 2 illustrates headend 20' and hub 40' according to another embodiment of the invention.

Headend 20' is connected, via headend to hub network 30 to hub 40'. Hub 40' is connected to multiple user devices via hub to user device network 31. Typically, multiple hubs and/or nodes are connected to a single headend, but for simplicity of explanation a single hub and a single headend are illustrated.

Hub 40' may exchange data, programs and control signals with multiple user devices. The main path for providing downstream signals from the hub to the user devices is also termed in-band, while the auxiliary path for providing upstream and downstream information is also referred to out-of-band path.

Conveniently, programs, data and control signals (including for example, content information) are transmitted via the in-band path while data and control signals (including for example, active messages and program removal response) are transmitted via the out-of-band path.

Hub 40' includes a hub management unit 54, in-band transmit/receive module (denoted "In-band RX/TX module") 44 and out-of-band transmit/receive module (denoted "Out-of-band RX/TX module") 46. The hub management unit 54 controls modules 44 and 46 and determines, either alone or by cooperating with the headend 20' which programs should be included with a program multiplex. The hub management unit 54 can also define modulation characteristics, control the provision of local content, calculate user viewing patterns and statistics, and the like.

Figure 3:
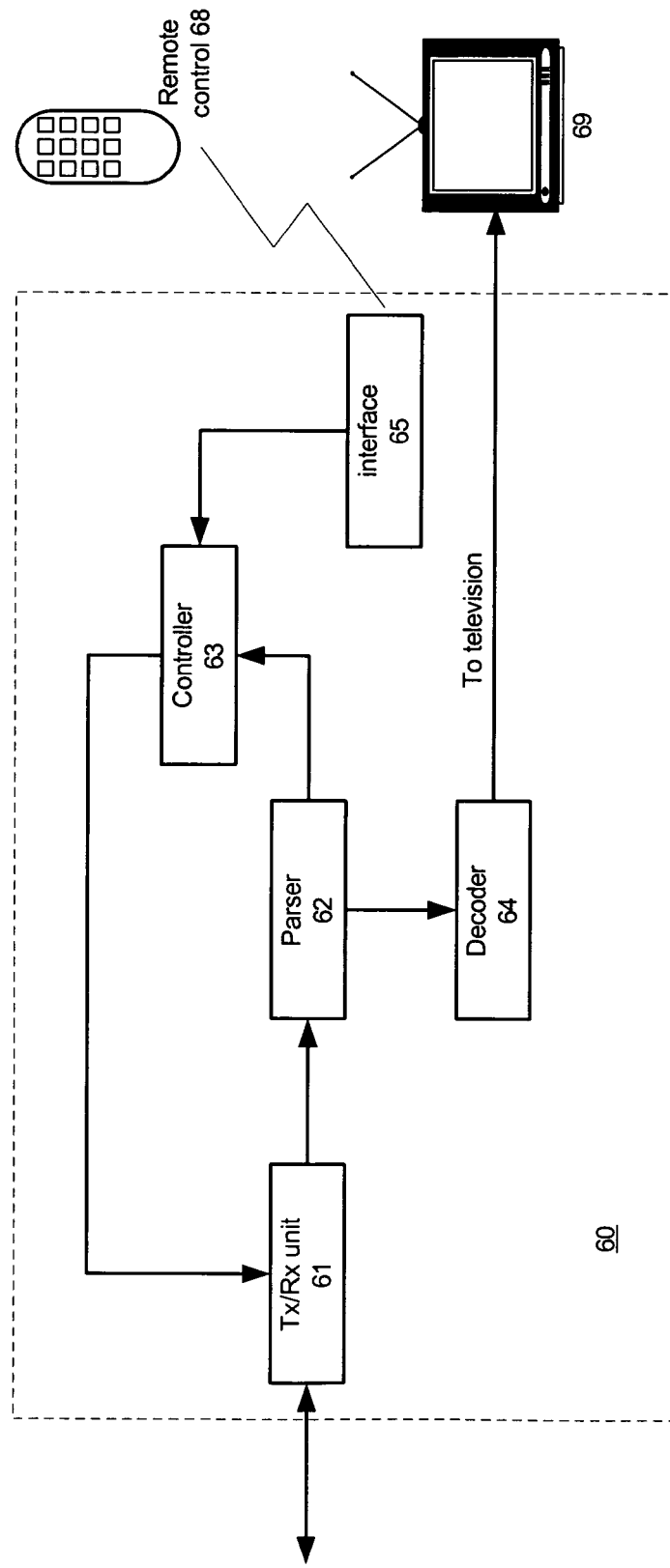
FIG. 3 illustrates a user device according to an embodiment of the invention.

FIG. 3 illustrates a user device 60, according to an embodiment of the invention.

Device 60 can be a set top box or another computerized entity. It is connected to a display, such as television 69 and can receive instructions from a remote control, via interface 68. Thus, instructions such as change program instructions, alter picture or sound related instructions, as well as signals exchanged during interactive sessions are received by interface 65 and sent to controller 63.

The analysis of these signals can indicate if a user views the received programs. The analysis can be responsive to the length of viewed programs, and/or to viewing patterns of the viewers. The interface 65 can also receive signals sent to the television, thus provide additional indication about the viewing related activities of the user.

User device 60 also includes a transceiver unit (denoted RX/TX unit) 61 that is adapted to receive and transmit signals, such as radio frequency signals, over a hub to user device network 31. Unit 61 usually includes a tuner, a modulator, a de-modulator and a transmitter. It is controlled by controller 63 that can set various reception and/or transmission parameters such as tuner frequency, modulation and demodulation schemes and the like.

The transceiver unit 61 is connected to parser 62 that can selectively provide data and control signals to controller 63 while sending programs to decoder 64. Decoder 64 is connected to television 69.

Figure 4:
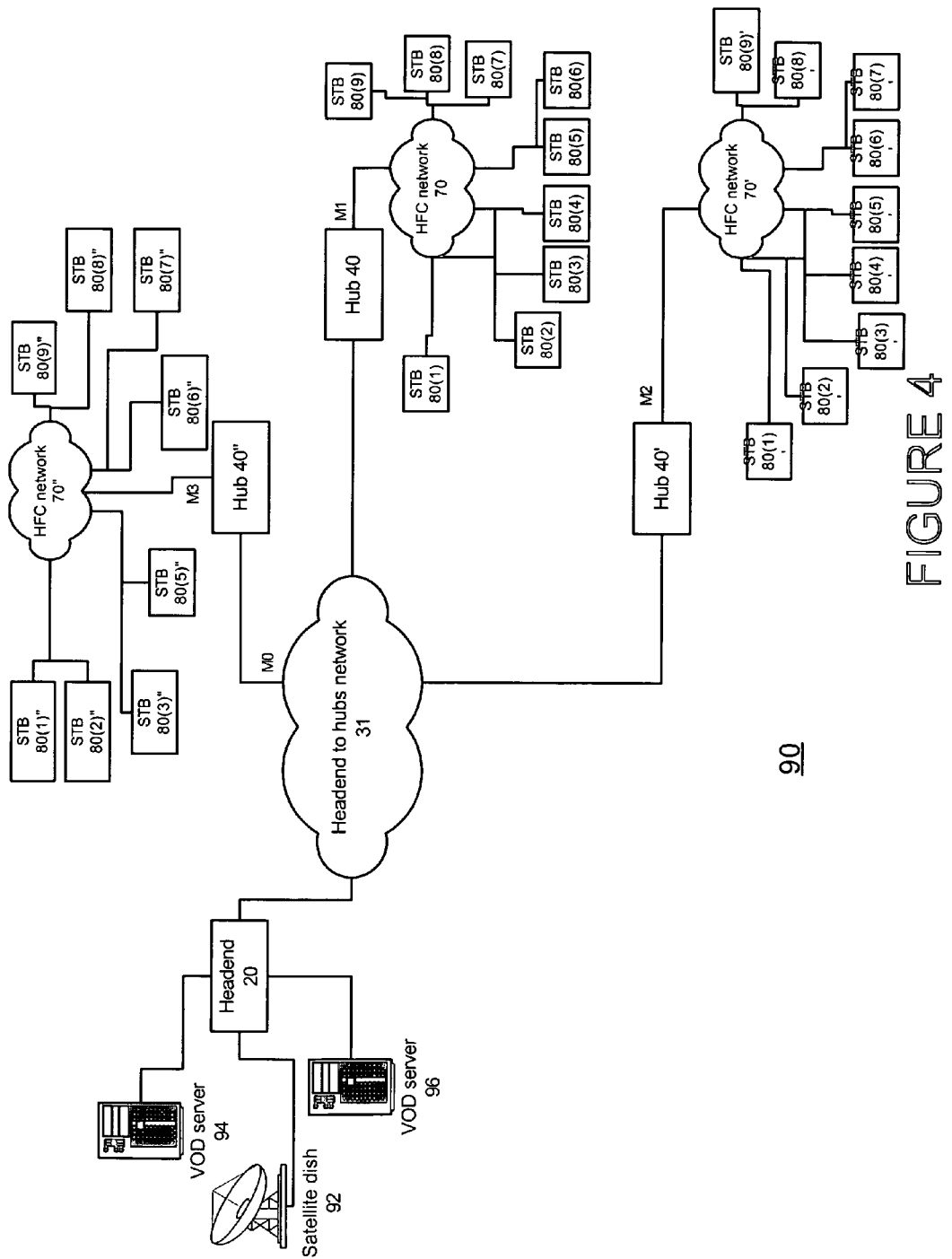
FIG. 4 illustrates a cable network according to an embodiment of the invention.

FIG. 4 illustrates a cable network 90 according to an embodiment of the invention.

Network 90 includes headend 20 that is connected to multiple content providers such as Video On Demand (VOD) servers 94 and 96 and satellite dish 92. It is noted that the amount of content providers as well as their type can differ from those illustrated in FIG. 4.

Headend 20 is connected, via headend to hubs network 31 to three hubs 40, 40' and 40". It is noted that it can be connected to different hubs via different networks, that more than three hubs can be connected to headend 20 and that network 90 can include additional intermediate devices, such as nodes.

Each hub (40, 40' and 40") is connected to multiple user devices via a hub to user devices network such as HFC networks 70, 70' and 70".

Each hub can be connected to a large number of user devices. Many HFC networks are connected to hundreds of user devices and even to more than one thousand user devices. For simplicity of explanation only nine user devices are illustrated as being connected to each hub. For example, user devices STB 80(1)-STB 80(9) are connected to hub 40, user devices STB 80(1)'-STB 80(9)' are connected to hub 40', and user devices STB 80(1)"-STB 80(9)" are connected to hub 40".

Each network out of HFC networks 70, 70' and 70" can supply to the user devices a different program multiplex. Hub 40 provides hub multiplex M1, Hub 40' provides hub multiplex M2 and hub 40" provides hub multiplex M3. Headend 20 sends headend multiplex M0 to the three hubs.

Conveniently, M0 can include all the content of M1, M2 and M3, although each hub can insert local content to the hub multiplex. Conveniently, M0 includes all the programs that are included within M1-M3.

Conveniently, headend 20 determines which program to remove from the multiplex M0, which program to add, when to send program removal indications, how to respond to program removal responses, to the reception or lack of receptions of active messages, and the like. It is noted that this is not necessarily so and other components (such as hubs) can perform some or all of these decisions, or participate (along with the headend or another component) in such a decision.

Figure 5:
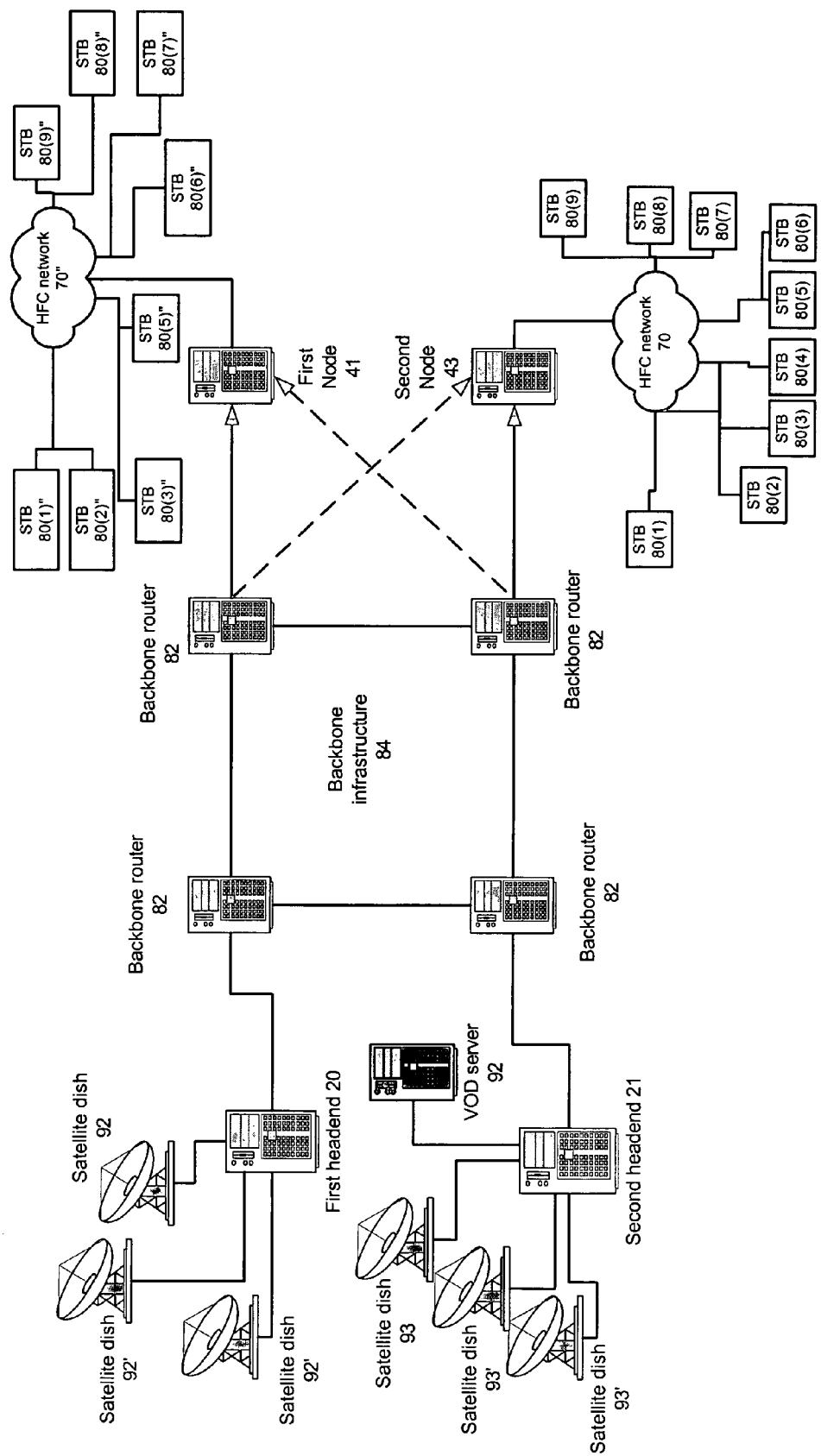
FIG. 5 illustrates a cable network according to another embodiment of the invention.

FIG. 5 illustrates a cable network 91 according to another embodiment of the invention.

Cable network 91 includes a first headend 20 and a second headend 21. The first headend 20 receives programs from satellite dishes 92, 92', and 92". The second headend 21 receives programs from satellite dishes 93, 93' and 93", as well as from VOD server 92.

First headend 20 is connected to first node 41 via backbone infrastructure 84. The backbone infrastructure 84 includes multiple backbone routers 82. Second headend 21 is connected to second node 43 via backbone infrastructure 84. First node 41 is connected to multiple user devices 80(1)"-80(9)" via HFC network 70". Second node 43 is connected to multiple user devices 80(1)-80(9) via HFC network 70.

The first headend 20 can determine which programs to remove (or add to) from the hub multiplex that is sent over HFC network 70" while the second headend 21 can determine which programs to add to (or remove from) the hub multiplex that is sent over HFC network 70.

Redundancy can be provided by supplying the same programs from multiple backbone routers 82. In such a case first headend 20 can send stream removal indications and receive program removal responses from user devices that are connected to HFC network 70 as well as those that are connected to HFC network 70". According to another embodiment of the invention the first headend 20 can send program removal indications and/or receive program removal responses and/or respond to program removal responses from user devices 80(1)"-80(9)".

Figure 6:
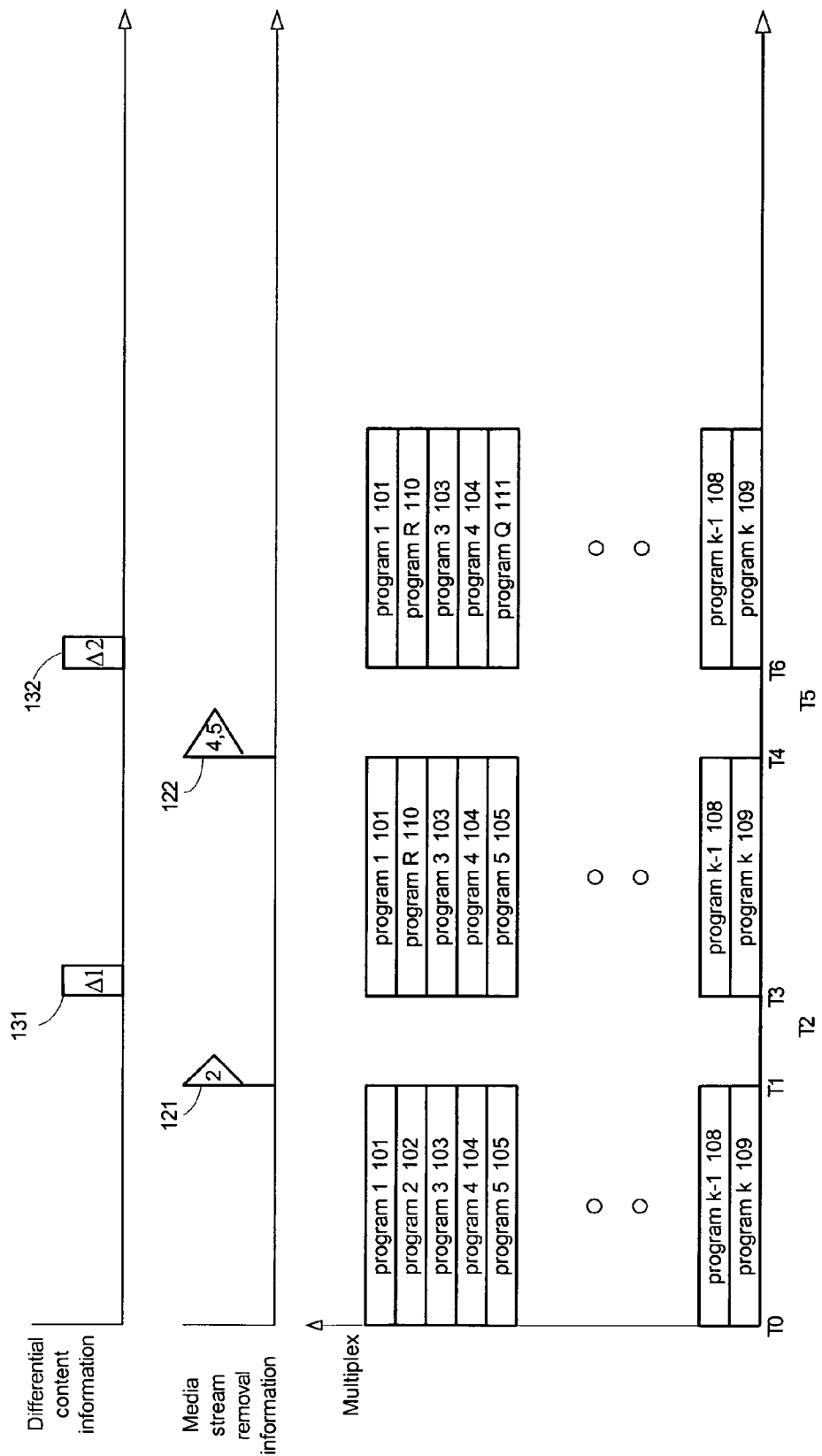
FIG. 6 illustrates various programs and signals exchanged over a cable network according to an embodiment of the invention.

FIG. 6 illustrates various programs and signals exchanged over a cable network according to an embodiment of the invention.

It is assumed that the illustrated programs belong to M1. Between T0 and T3 M1 includes K programs 101-109. K is a positive integer that is usually greater then fifty.

Before T1 or at T1 headend 20 considers the removal of second program 102 and to replace it by program R 110. The decision can be responsive to various parameters, including lack of interest in the second program 102, a request to view program R 110, an expectation that program R 110 will be requested, bandwidth constraints, and the like.

At T1 headend 20 sends to user devices 80(1)-80(9) a program removal indication (illustrated as flag 121) that indicates that headend 20 considers to remove second program 102. Headend 20 waits to receive a stream removal response during a predefined waiting period.

At T2, in response to received responses (or to an absence of such responses) headend 20 decides to replace the second program 102 by program R 110.

According to an embodiment of the invention the program removal indication can also include the time of the removal.

Headend 20 sends at T3 a differential content information message 131 that indicates that the second program 102 was replaced by program R 110.

At T3 the second program 102 is replaced by program R 110 and M1 includes the first program 101, program R, and third to K'th programs 103-109. M1 remains the same until T6.

Before T4 or at T4 headend 20 considers the removal of the fourth and fifth programs 104 and 105 and the inclusion of one or more programs, such as program Q 111 within M1. The decision can be responsive to various parameters, including lack of interest in the fourth and fifth programs 104 and 105, a request to view various programs including program Q 111, an expectation that program Q 111 will be requested, bandwidth constraints, and the like.

At T4 headend 20 sends to user devices 80(1)-80(9) a program removal indication (illustrated as flag 122) that indicates that headend 20 considers to remove fourth and fifth programs 104 and 105.

Headend 20 waits to receive a stream removal response. At T5, in response to received responses (or to an absence of such responses) headend 20 decides to replace the fifth program 105 by program Q 111 but to continue to transmit the fourth program 104.

Headend 20 sends at T6 differential content information message 132 that indicates that the fifth program 105 is being replaced by program Q 111.

At T6 the fifth program 105 is replaced by program Q 111 and M1 includes the first program 101, program R, third and fourth programs, program T, and the sixth to the K'th programs 101, 110, 103, 104, 111, 106-109.

Headend 20 transmits content information messages or differential content information messages that can assist the user devices to seamlessly switch between programs. A user device will send a request to receive a certain program if that program is not included within the hub multiplex that is provided to the user device. The content information can include various information such as carrier frequency and modulation that can assist the user device to switch between programs. Conveniently, the user device sends an indication when is switches to another program, even if that program, belongs to the received multiplex. This enables the headend to track the viewing patters of the users. According to another embodiment of the invention the indication is not sent if the program is defined as a static program.

In order to reduce bandwidth the content information can be sent in a differential manner. Differential content information messages can indicate differences between a previously transmitted program multiplex and a currently transmitted program multiplex.

According to another embodiment of the invention the headend 20 can determine whether to send content information messages or differential content information messages. The determination can be responsive to the amount of changes between the pervious and current program multiplexes. For example, if more than half of the programs are replaced simultaneously then the content information messages can be smaller than the differential content information messages.

FIG. 7 illustrates a content information table 200 according to an embodiment of the invention. Content information table 200 includes a list of programs that are included within the program multiplex as well as multiple associated parameters. These parameters can include, for example, the program name, tuning frequency, modulation type, program identification field (such as an MPEG compliant PID), and program type (switched, static, and the like).

FIG. 8 illustrates a differential content information message 131 according to an embodiment of the invention. Differential content information message 131 is transmitted at T3 and indicates that the second program 102 is removed (program type is 'REMOVED') and that program R 110 is provided. The parameters of program R 110 are included within the differential content information message 131.

The content information can also determine the type of program—for example whether the program is static or switched. In the former case the user devices knows that the program will not be replaced, and thus can ignore program removal information if it is tuned to than program.

According to an embodiment of the invention headend 20 can receive user viewing indications about users viewing related operations (gathered by the user device) and try to estimate the viewing patterns of the user and/or generate viewing statistics. The statistics and/or viewing patterns can be used by headend 20 to decide which programs to remove from a program multiplex and which program to add to the program multiplex.

FIG. 9 illustrates a program viewing table 230 according to an embodiment of the invention. Table 230 includes four columns 232-238. The first column 232 includes the names of the programs, the second column includes the amount of users that are viewing the program (or at least an estimate of their number), the identity of user devices that are tuned to receive each programs and user viewing information that reflects the operations that are received by interface 65. Table 230 illustrates that if the number of viewers exceeds a certain threshold then the user viewing information is irrelevant.

According to an embodiment of the invention the switching between programs can be speeded up by generating multiple time-shifted versions of a program and providing a single version that includes an independently decodable frame (or picture) that follows the switching point by the shortest period, in relation to corresponding independently decodable frames of other versions of the program.

Figure 10:
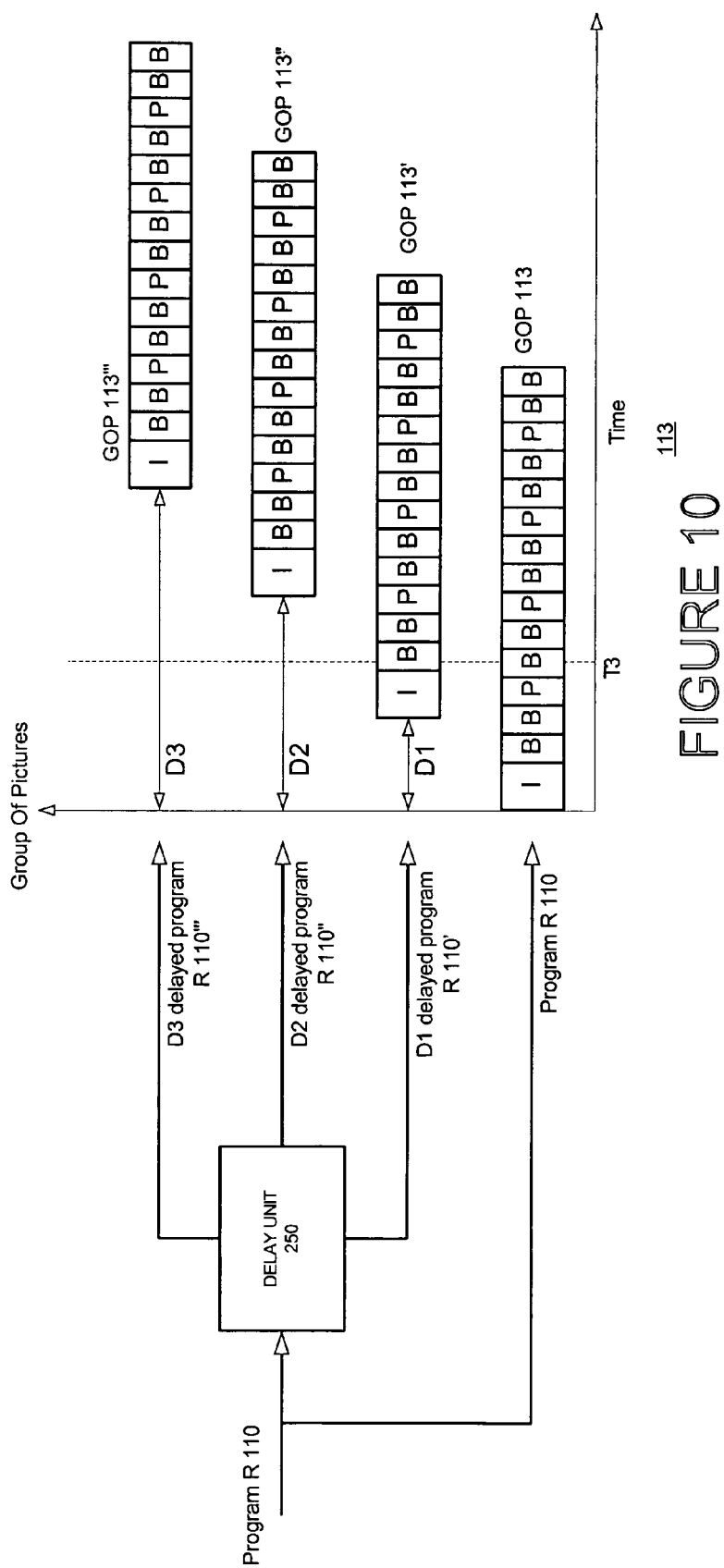
FIG. 10 illustrates a delay unit and a timing diagram according to an embodiment of the invention.
Figure 11:
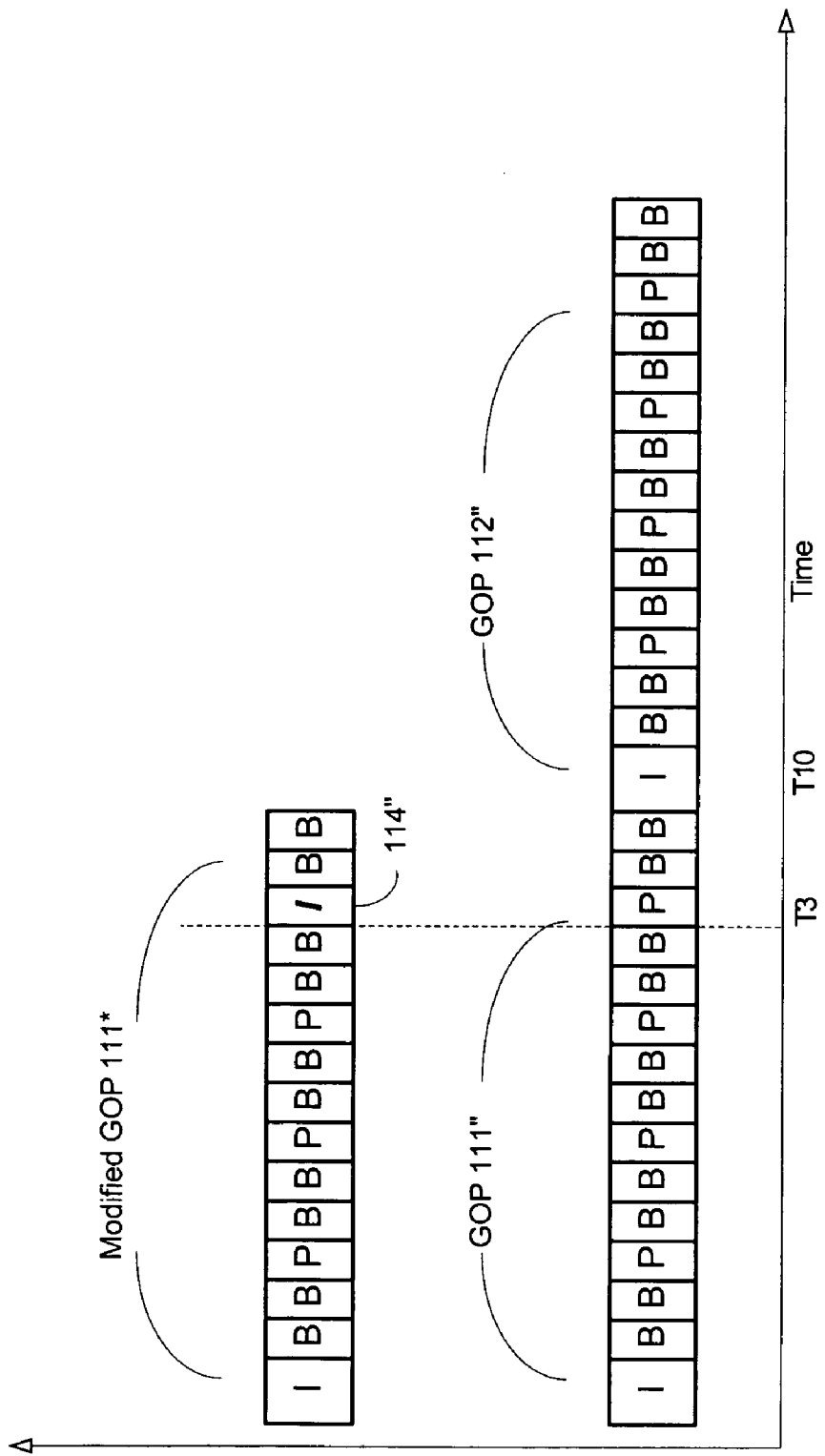
FIG. 11 illustrates various group of pictures, according to an embodiment of the invention.

FIG. 10 illustrates delay unit 250 and a timing diagram 113 according to an embodiment of the invention.

The delay unit 250 is conveniently included within media processor 210. It receives a program and generated multiple time-shifted versions of that program. The program can be provided to the delay unit 250 near an expected addition of that program to the multiplex. A program should be added at a frame that can be independently decodable, such as an I-frame. Typically, various frame types (including P-frames and B-frames) are transmitted at group of pictures that are also referred to as GOPs. A GOP starts with an I-frame.

Once the headend decides to add a program (usually as a result from a request to view that program), the switching (or adding) period can be shortened by providing a program that includes a I-frame that follows the decision moment and is relatively close to that decision moment. This can be facilitated by generating multiple time-shifted versions of a certain program, and selecting one version in response to time difference between the decision moment and the occurrence of an I-frame.

For example, delay unit 250 receives program R 110 and outputs program R 110, and three time-shifted versions referred to as D1 delayed program R' 110', D2 delayed program R'' 110'' and D3 delayed program R''' 110'''. Timing diagram illustrates a single GOP (GOP 113, GOP 113', GOP 113'' and GOP 113''') from each of these programs.

One of the delayed programs (or even the original program) should be added to the multiplex shortly after T3. GOP 113'' (and accordingly time-shifted program 111'') is selected it includes the I frame that is closets (and follows) to T3.

According to an embodiment of the invention the headend (or hub) speeds the switching process by changing the type of one or more frame (B frame or P frame) to an independently decoded frame. For example, a B-frame can replaced by a P frame. GOP 111'' is modified (to provide a modified GOP 111*), prior to the switching point (at T3) by replacing a P frame that follows T3 by an I frame. Modified GOP 111* is followed by GOP 112''.

Figure 12:
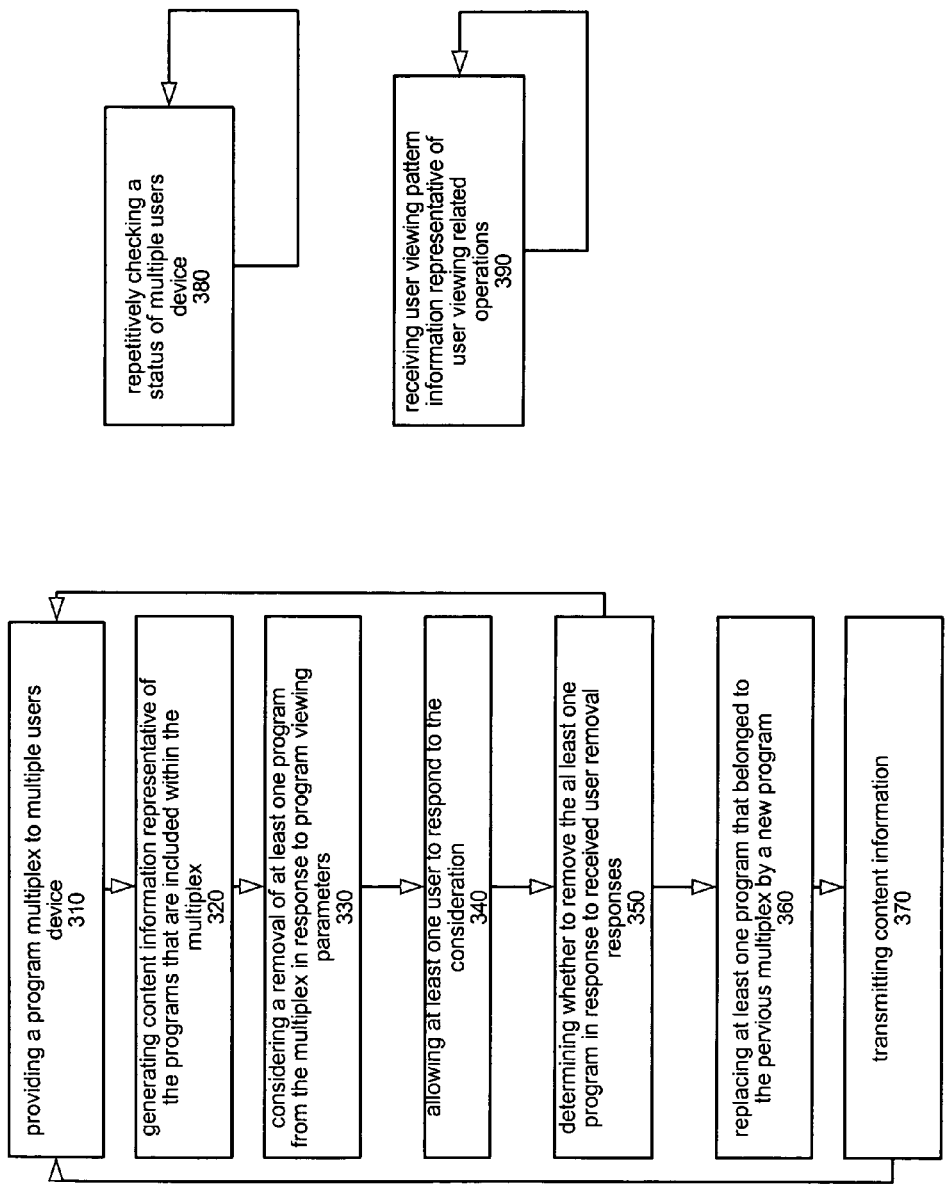
FIG. 12 illustrates a method for providing programs, according to an embodiment of the invention.

FIG. 12 illustrates method 300 for providing programs, according to an embodiment of the invention.

Method 300 starts by stages 310 and 320. Stage 310 includes providing a program multiplex to multiple users device.

Stage 320 includes generating content information representative of the programs that are included within the multiplex. This information is sent to the users. Conveniently, the content information includes program frequency, program identification information, program modulation information, and the like.

According to an embodiment of the invention instead of sending content information representative of the whole content of the multiplex, only differential content information messages are transmitted. Differential content information represents changes between a previous content of the multiplex and a current content of the multiplex.

According to yet another embodiment of the invention each user out of a group of multiple users is associated with unique program parameters. Thus, each device that is connected to a certain HFC network has a dedicated combination of carrier frequency and PID and the headend switches between programs provided to this user device by changing the parameters (PID, carrier frequency) of the program. In this case the headend (or hub) should be capable of performing program duplication (in case that multiple users request to receive the same program), and PID-remapping. In such a case only the programs that are currently viewed by the users are included within the multiplex.

Conveniently, the headend 20 sends to the hubs a multiplex (such as M0) that is then split to different multiplexes (M1-M3) that are provides by different hubs to different HTC networks. In such a case the characteristics (for example PID and carrier frequency) of a program within M0 can differ from the parameters of that program within either one of M1, M2 or M3. In such a case the hubs can perform PID re-mapping and/ or frequency alterations.

Stage 330 can follow stage 310 or at least partially overlap stage 310. Stage 330 includes considering a removal of at least one program from the multiplex in response to program viewing parameters. The program viewing parameters can reflect the amount of users that view each program, a removal priority of the program, the program type, an expectation to view a new program and the like.

The amount of users that view a program can be estimated by the tuning parameters (such as carrier frequency and/or PID) of the user devices, by active messages that indicate that the user devices are still active, by user viewing information (such as received instructions) reflecting that the user view the program. In order to evaluate the status (active, idle) of a user device and in order to estimate whether the user views a program method 300 includes optional stages such as stages 380 and 390.

Stage 330 is followed by stage 340 of allowing at least one user to respond to the consideration. Conveniently, stage 340 includes sending program removal indication to at least one user device and waiting to receive at least one user program removal response.

The waiting stage can be limited to a waiting period. At the end of the waiting period any received program removal responses are evaluated in order to determine whether to perform the program removal of not. The determination is usually also responsive to additional parameters such as available bandwidth, requests to add a program, an expectation that a certain program will be requested, programs removal priority, and the like.

Stage 340 is followed by stage 350 of determining whether to remove the at least one program in response to received user removal responses. It is noted that the determination can be responsive to a scenario in which no program removal response was received.

Stage 350 is followed by stage 310, if no replacement is required. Else, stage 350 is followed by stage 360 of replacing at least one program that belonged to the pervious multiplex by a new program.

Stage 360 conveniently includes at least one of the following stages: (i) altering a type of at least one frame of a program adjacent to an addition of that program to the multiplex, and (ii) generating multiple versions of a certain program, wherein different versions of the certain program are time shifted from each other, selecting one version out of the multiple versions to add to the multiplex; wherein the selection is responsive to a timing of the adding.

Stage 360 is followed by stage 370 of transmitting content information. Stage 370 is followed by stage 310.

As illustrated by stage 380, method 300 also includes repetitively checking a status of multiple user devices. Conveniently, the checking includes determining whether active messages were received from the user device.

As illustrated by stage 390, method 300 includes receiving user viewing pattern information representative of user viewing related operations. The user viewing pattern information reflects a timing of at least one user viewing related operation.

FIG. 13 illustrates a method 400 for receiving programs, according to an embodiment of the invention.

Method 400 starts by stage 410 of receiving a program multiplex.

Stage 410 is followed by stage 420 of receiving a program removal indication.

Stage 420 is followed by stage 430 of selectively transmitting a program removal response.

Method 400 also includes various optional stages (such as stages 440 and 450) that allow another entity, such as a hub or a headend, to evaluate the status of the user device and whether the user views the programs that are selected by the user device.

Stage 440 includes transmitting active messages indicating that the user device is active. Stage 450 includes generating user viewing pattern information representative of user viewing related operations. Conveniently, the user viewing pattern information reflects a timing of at least one user viewing related operation.

Method 400 further includes stage 460 of responding to a user request to switch between programs.

Stage 460 can include determining whether the program is already provided to the user device. If not, the user device can generate a request to add a program to the program multiplex.

The determination can be responsive to content information. The content information can have many forms and can be received during one or multiple reception sessions. A user device can determine the content of a program multiplex in response to an initial content information message and in response to one or more differential content information that were received during later content information reception sessions.

For example, assuming that at T0 the user device received content information that indicates that multiplex M1 includes programs 1-K 101-109, and that at T3 is receives differential content information 131 that indicates that the second program 102 is replaced by program R 110 then the user device is aware that after the removal M1 includes the first program 101, program R, and third till K'th programs 103-109. If the user request to receive a program that is not included within M1 (such as program Q) is can transmit a request to receive program Q.

If for example, the user wishes to switch to the K'th program 109 then the switching does not involve sending a request to receive a new program and the user device tunes to the new program, by using the program parameters (such as frequency, PID and modulation type) included within the content information.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for providing programs, the method comprising:
   providing a program multiplex over a network selected from a group consisting of a hub to user device network and a hybrid coax fiber network, to multiple user devices;
   identifying a possible removal of at least one program from the program multiplex in response to program viewing parameters, wherein the analyzing is performed by a device that is coupled to the multiple user devices via the network;
   allowing at least one user to respond to the possible removal of the at least one program from the program multiplex that is being provided; and
   determining whether to remove the at least one program from the program multiplex in response to received program removal responses from the at least one user, wherein the determining is performed by the device that is coupled to the multiple user devices via the network;
   wherein a program removal response of the program removal responses is associated with a program of the at least one program and comprises at least one out of: (i) a request to delay a removal of the program from the program multiplex; (ii) a requested delay before the removal of the program from the program multiplex; and (ii) a parameter that reflects an amount of acceptance or rejection to the removal of the program from the program multiplex, the parameter differs from an acceptance or approval of the removal of the program;
   wherein the removal is followed by transmitting a modified program multiplex that does not include the removed at least one program.

2. The method according to claim 1 comprising sending to the at least one user a pro am removal indication indicative of a possible removal of a program from the program multiplex, wherein the program removal indication comprises a time of the possible removal.

3. The method according to claim 1 wherein the determining is responsive to programs removal priorities.

4. The method according to claim 1 wherein the program removal response comprises a request to delay the removal of the program from the program multiplex.

5. The method according to claim 1 wherein the program removal response comprises the parameter that reflects the amount of acceptance or rejection to the removal of the program from the program multiplex, the parameter differs from the acceptance or approval of the removal of the program.

6. The method according to claim 1 further comprising generating content information representative of the programs that are included within the program multiplex.

7. The method according to claim 6 wherein the content information further comprises program frequency and program identification information.

8. The method according to claim 1 wherein the program removal response comprises the requested delay before the removal of the program from the program multiplex.

9. The method according to claim 1 further comprising generating, by the device that is coupled to the multiple user devices via the network differential content information representative of changes between a previous content of the program multiplex and a current content of the multiplex and transmitting the differential content information to the user devices out of band.

10. The method according to claim 1 further comprising associating unique program parameters to each user device out of a group of multiple user device and switching between programs supplied to a user by changing program parameters of a program that is sent to the user device.

11. The method according to claim 1 further comprising determining whether to send content information messages to the user device or to send differential content information representative of changes between a previous content of the program multiplex and a current content of the multiplex receiving user viewing pattern information representative of user viewing related operations.

12. The method according to claim 1 comprising classifying programs to various groups that differ from each other by a probability of removal from the program multiplex and removing a program from the program multiplex based on a classification of the program.

13. The method according to claim 1 further comprising:
   generating multiple versions of a certain program, wherein different versions of the certain program are time shifted from each other, and
   selecting one version out of the multiple versions to add to the program multiplex; wherein the selection is responsive to a timing of the adding.

14. The method according to claim 1 further comprising altering a type of at least one frame of a program adjacent to an addition of that program to the program multiplex.

15. A method for receiving programs, the method comprises:
   receiving a program multiplex over the network selected from a group consisting of a hub to user device network and a hybrid coax fiber network;
   receiving a program removal indication by at least one user device, wherein the program removal indication is sent by a device that is coupled to the at least one user device via the network;
   selectively transmitting over the network a program removal response;
   wherein the program removal response is associated with a program of the at least one program and comprises at least one out of: (i) a request to delay a removal of the program from the program multiplex; (ii) a requested delay before the removal of the program from the program multiplex; and (ii) a parameter that reflects an amount of acceptance or rejection to the removal of the program from the program multiplex, the parameter differs from an acceptance or approval of the removal of the program;
   receiving a new program multiplex that is responsive to the program removal indication and to the program removal response;
   switching to a program that is included in the new program multiplex; and
   selectively transmitting over the network an indication about the switching to the program.

16. The method according to claim 15 further comprising transmitting to the device that is coupled to the at least one user device via the network active messages indicating that the user device is active.

17. The method according to claim 15 wherein the program removal response comprises a request to delay the removal of the program from the program multiplex.

18. The method according to claim 15 wherein the program removal response comprises a requested delay before the removal of the program from the program multiplex.

19. The method according to claim 15 wherein the program removal response comprises the parameter that reflects the amount of acceptance or rejection to the removal of the program from the program multiplex, the parameter differs from the acceptance or approval of the removal of the program.

20. The method according to claim 15 further comprising generating user viewing pattern information representative of user viewing related operations.

21. The method according to claim 15 comprising receiving at a first point in time content information messages to the user device and receiving at a second point in time differential content information representative of changes between a previous content of the multiplex and a current content of the program multiplex.

22. A device adapted to provide a program multiplex, the device comprising:
- a media processor adapted to generate a program multiplex, wherein the generated program multiplex is provided, over a network selected from a group consisting of a hub to user device network and a hybrid coax fiber network, to multiple user devices; and
- a management unit coupled to the media processor and adapted to consider a removal of at least one program from the program multiplex when the program multiplex is being provided to multiple user devices and in response to program viewing parameters, the management unit being further adapted to determine the removal of the at least one program from the program multiplex in response to a user program removal response received over the network;
- wherein a program removal response is associated with a program included in the program multiplex and comprises at least one out of: (i) a request to delay a removal of the program from the program multiplex; (ii) a requested delay before the removal of the program from the program multiplex; and (ii) a parameter that reflects an amount of acceptance or rejection to the removal of the program from the program multiplex, the parameter differs from an acceptance or approval of the removal of the program;
- wherein the device is coupled to the multiple end user device via the network.

23. The device according to claim 22 wherein the device is adapted to transmit a program removal indication to at least one user device, wherein the program removal indication comprises a time of the possible removal.

24. The device according to claim 22 wherein the device is adapted to determine the removal in response to programs removal priorities.

25. The device according to claim 22 wherein the program removal response comprises a request to delay the removal of the program from the program multiplex.

26. The device according to claim wherein the program removal response comprises the parameter that reflects the amount of acceptance or rejection to the removal of the program from the program multiplex, the parameter differs from the acceptance or approval of the removal of the program.

27. The device according to claim 22 further adapted to generate content information representative of the programs that are included within the program multiplex.

28. The device according to claim 27 wherein the content information further comprises program frequency and program identification information.

29. The device according to claim 22 wherein the program removal response comprises the requested delay before the removal of the program from the program multiplex.

30. The device according to claim 22 further adapted to generate differential content information representative of changes between a previous content of the program multiplex and a current content of the multiplex and to transmit the differential content information out of band.

31. The device according to claim 22 further adapted to associate unique program parameters with each user device out of a group of multiple user devices and to change program parameters of a program that is sent to a user device based on the unique program parameters of the user device.

32. The device according to claim 22 further adapted to determine whether to send content information messages to the user device or to send differential content information representative of changes between a previous content of the multiplex and a current content of the multiplex.

33. The device according to claim 22 further adapted to classify programs to various groups that differ from each other by a probability of removal from the program multiplex and remove a program from the program multiplex based on a classification of the program.

34. The device according to claim 22 further adapted to generate multiple versions of a certain program, wherein different versions of the certain program are time shifted from each other, to select one version out of the multiple versions to add to the program multiplex; wherein the selection is responsive to a timing of an addition of the program to the program multiplex.

35. The device according to claim 22 further adapted to alter a type of at least one frame of a program adjacent to an addition of that program to the program multiplex.

36. A user device, comprising: a transceiver unit coupled to a controller, wherein the device is adapted to:
- receive a program multiplex, from a device that is coupled to the user device over a network selected from a hub to user device network and a hybrid fiber coax network,
- receive, over the broadband network, an indication that at least one program is to be removed from the multiplex;
- selectively transmit over the network a program removal response;
- wherein the program removal response is associated with a program included in the program multiplex and comprises at least one out of: (i) a request to delay a removal of the program from the program multiplex; (ii) a requested delay before the removal of the program from the program multiplex; and (ii) a parameter that reflects an amount of acceptance or rejection to the removal of the program from the program multiplex, the parameter differs from an acceptance or approval of the removal of the program;
- switch to a program that is included in the new program multiplex; and
- selectively transmit an indication about the switching to the program.

37. The user device according to claim 36 further adapted to transmit active messages to the device that is coupled to the user device via the network, indicating that the user device is active.

38. The user device according to claim 36 wherein the program removal response comprises a request to delay the removal of the program from the program multiplex.

39. The user device according to claim 36 wherein the program removal response comprises a requested delay before the removal of the program from the program multiplex.

40. The user device according to claim 36 wherein the program removal response comprises the parameter that reflects the amount of acceptance or rejection to the removal of the program from the program multiplex, the parameter differs from the acceptance or approval of the removal of the program.

41. The user device according to claim 36 further adapted to generate user viewing pattern information representative of user viewing related operations.

42. The user device according to claim 41 wherein the user viewing pattern information reflects a timing of at least one user viewing related operation.

* * * * *